(12) United States Patent
Allam et al.

(10) Patent No.: US 7,356,609 B1
(45) Date of Patent: Apr. 8, 2008

(54) METHOD AND SYSTEM FOR OPTIMIZING INTERFACES FOR NON-ROUTED PPP SESSIONS USING PPP GLOBAL INTERFACE

(75) Inventors: Bhasker Allam, Fremont, CA (US); Harsha Vardhan Jagannati, Fremont, CA (US)

(73) Assignee: Network Equipment Technologies, Inc., Fremont, CA (US)

(*) Notice: Subject to any disclaimer, the term of this patent is extended or adjusted under 35 U.S.C. 154(b) by 835 days.

(21) Appl. No.: 10/388,888

(22) Filed: Mar. 14, 2003

(51) Int. Cl.
*G06F 3/14* (2006.01)
(52) U.S. Cl. ............... 709/238; 709/203; 709/228; 370/351; 707/10
(58) Field of Classification Search ............. 709/227, 709/229, 203, 228, 238; 370/329, 389, 466, 370/351; 707/10
See application file for complete search history.

(56) References Cited

U.S. PATENT DOCUMENTS

| | | | |
|---|---|---|---|
| 6,691,117 B2 * | 2/2004 | Ellison et al. ............... | 707/10 |
| 6,778,524 B1 * | 8/2004 | Augart ........................ | 370/351 |
| 6,826,172 B1 * | 11/2004 | Augart ........................ | 370/351 |
| 6,885,677 B1 * | 4/2005 | Klevans ...................... | 370/466 |
| 6,970,459 B1 * | 11/2005 | Meier ......................... | 370/389 |
| 7,032,012 B2 * | 4/2006 | Roh ............................ | 709/220 |
| 7,200,673 B1 * | 4/2007 | Augart ........................ | 709/238 |
| 2003/0041151 A1 * | 2/2003 | Senapati et al. ............ | 709/229 |
| 2005/0025161 A1 * | 2/2005 | Spooner ...................... | 370/401 |

* cited by examiner

*Primary Examiner*—Khanh Dinh
(74) *Attorney, Agent, or Firm*—Townsend and Townsend and Crew, LLP

(57) ABSTRACT

An optimized interface for handling routed and non-routed point-to-point sessions is provided. According to one exemplary aspect, when a PPP session is established for a client, an interface data structure or module is dynamically created for the client corresponding to the PPP session. The interface data structure includes, for example, Layer-2 and Layer-3 information relating to the PPP session. Upon its creation, the interface data structure is linked to the optimized interface. The created interface data structure is then used by the optimized interface to facilitate communications with the client for the duration of the PPP session.

18 Claims, 3 Drawing Sheets

```
For PPP:
--------
typedef struct _ppp_session_info_ {
    unsigned long    msucid;
    unsigned char    ctrlmsu;
    unsigned long    ctrldid;
    unsigned char    circuit_type;
    unsigned long    ip_address;
    char             user_name[CIRCUIT_NAME_LEN];
    unsigned char    pppoe_flag;
    pppoe_session_info_t *pppoe_session_info;
    unsigned long    data_did[MAX_MSUS];
    struct _ppp_session_info_ * next;
}ppp_session_info_t;
```

FIG. 2A

```
struct ifnet {                    /* and the entries */
    void    *if_softc;            /* lower-level data for this if */
    TAILQ_ENTRY(ifnet) if_list;   /* all struct ifnets are chained */
    TAILQ_HEAD(, ifaddr) if_addrlist; /* linked list of addresses per if
*/
    char    if_xname[IFNAMSIZ];   /* external name (name + unit) */
    int     if_pcount;            /* number of promiscuous listeners */
    caddr_t if_bpf;               /* packet filter structure */
    u_short if_index;             /* numeric abbreviation for this if */
    short   if_timer;             /* time 'til if_watchdog called */
    short   if_flags;             /* up/down, broadcast, etc. */
    short   if__pad1;             /* be nice to m68k ports */
    struct  if_data if_data;      /* statistics and other data about if */

/*
     * Procedure handles.  If you add more of these, don't forget the
     * corresponding NULL stub in if.c.
     */ int (*if_output)              /* output routine (enqueue) */
        __P((struct ifnet *, struct mbuf *, struct sockaddr *,
             struct rtentry *));
    void    (*if_input)           /* input routine (from h/w driver) */
        __P((struct ifnet *, struct mbuf *));
    void    (*if_start)           /* initiate output routine */
        __P((struct ifnet *));
    int (*if_ioctl)               /* ioctl routine */
        __P((struct ifnet *, u_long, caddr_t));
    int (*if_reset)               /* XXX bus reset routine */
        __P((struct ifnet *));
    void    (*if_watchdog)        /* timer routine */
        __P((struct ifnet *));
    void    (*if_drain)           /* routine to release resources */
        __P((struct ifnet *));
#if ALTQ /* ALTQ */
    struct  ifaltq if_snd;        /* output queue (includes altq) */
#else
    struct  ifqueue if_snd;       /* output queue */
#endif
    struct  sockaddr_dl *if_sadl; /* pointer to our sockaddr_dl */
    u_int8_t *if_broadcastaddr;   /* linklevel broadcast bytestring */
    struct ifprefix *if_prefixlist; /* linked list of prefixes per if */

METHOD AND SYSTEM FOR OPTIMIZING INTERFACES FOR NON-ROUTED PPP SESSIONS USING PPP GLOBAL INTERFACE

BACKGROUND OF THE INVENTION

The present invention generally relates to routing interfaces and, more specifically, to a method for providing an optimized interface for non-routed point-to-point sessions.

In traditional edge routers, point-to-point (PPP) sessions are generally treated as virtual links. Each host connected to a router via a PPP session (virtual link) is provided a corresponding interface. Typically, when implemented in software, an interface is represented by an interface data structure that contains all the interface parameters. These parameters depend on the physical media properties and other information related to the proper functioning of the interface. Having an interface data structure for each virtual link, however, consumes significant memory and other computing resources.

Typically, all interfaces are routed interfaces. These interfaces are similar to any other interface on a router. These kinds of interfaces (virtual links) are very common for edge routers, which support a high number of PPP host subscribers. In most cases, it is not necessary to run complete set of routing protocols on these virtual links because most of them are connected to a single PPP end point and no further routing of traffic is needed. For example, individual computers connected to a server of an Internet service provider are typically used only to receive and transmit traffic between such computers and the server. These computers do not typically route any traffic received from the server to another computer. Consequently, the virtual link between such a computer and the server carries only data or non-routing traffic; in other words, no routing control traffic is transmitted. Since no routing control traffic is transmitted, much of the interface data structure for a virtual link remains unused thereby resulting in waste of computing resources.

Hence, it would be desirable to develop a method that is capable of an optimized interface for a virtual link in non-routed scenarios under which running of routing protocols is not expected.

BRIEF SUMMARY OF THE INVENTION

An optimized interface for handling non-routed point-to-point sessions is provided. According to one exemplary aspect, when a PPP session is established for a client, an interface data structure or module is dynamically created for the client corresponding to the PPP session. The interface data structure includes, for example, Layer-2 and Layer-3 information relating to the PPP session. Upon its creation, the interface data structure is linked to the optimized interface. The created interface data structure is then used by the optimized interface to facilitate communications with the client for the duration of the PPP session.

The present invention as described herein provides a number of advantages. For example, the present invention simplifies user configuration for PPP parameters on virtual routers thereby reducing the number of interfaces required in such routers. Furthermore, the present invention reduces the number of entries in a routing table as compared to existing PPP solutions in conventional routers.

Reference to the remaining portions of the specification, including the drawings and claims, will realize other features and advantages of the present invention. Further features and advantages of the present invention, as well as the structure and operation of various embodiments of the present invention, are described in detail below with respect to accompanying drawings, like reference numbers indicate identical or functionally similar elements.

BRIEF DESCRIPTION OF THE DRAWINGS

FIG. 2A is an illustration of an exemplary embodiment of a data structure constructed in accordance with the present invention; and FIG. 2B is an illustration of a typical interface data structure.

DETAILED DESCRIPTION OF THE INVENTION

Figure 1:
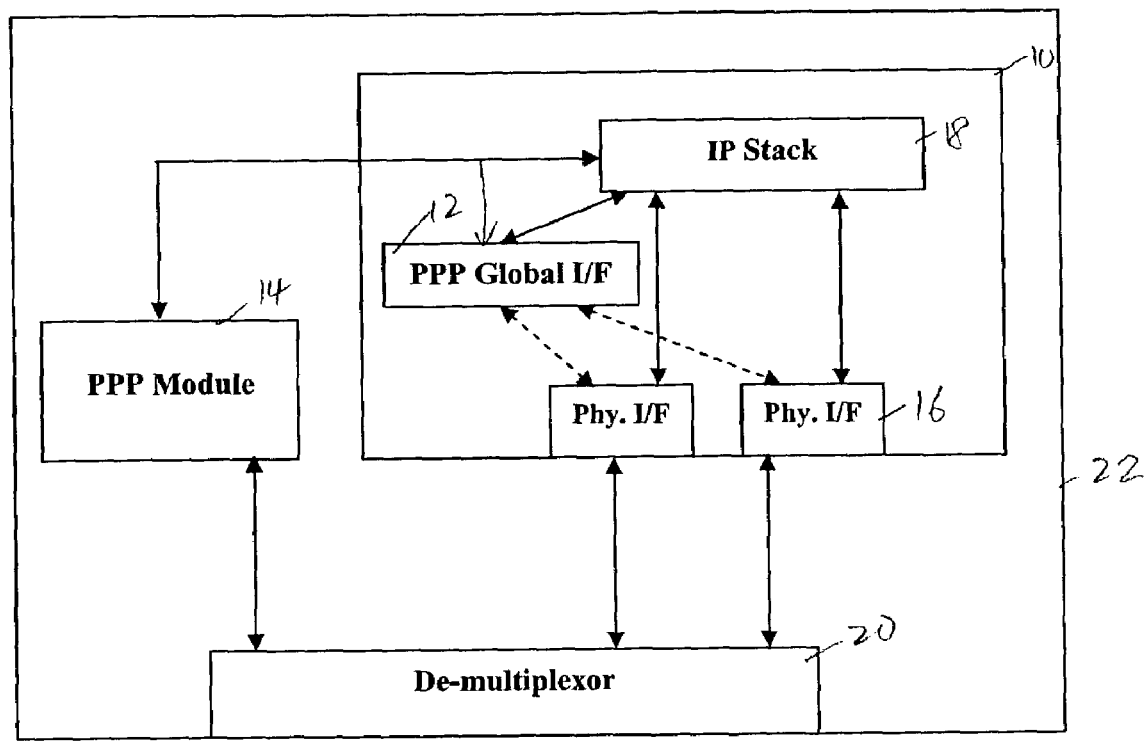
FIG. 1 is a simplified schematic diagram illustrating an exemplary embodiment of the present invention.

The present invention in the form of one or more exemplary embodiments will now be described. According to one exemplary embodiment of the present invention, an unnumbered interface data structure or module for a non-routed PPP link is dynamically created when a PPP session is established. The PPP link is then bound to a single interface, referred to as the PPP Global Interface, that is created when the router is first initialized. All the virtual links are treated via the unnumbered interface data structures.

FIG. 1 is a simplified schematic diagram illustrating an exemplary embodiment of the present invention. This exemplary embodiment is implemented within a device 22 having a virtual router 10. The router 10 includes a number of physical interfaces 16, the PPP Global Interface 12, an IP (Internet Protocol) stack 18 and a router control module (not shown). Each physical interface 16 is interfaced or coupled to a client or another device (not shown), such as, another router. It should be understood that communications with the physical interfaces 16 are achieved via corresponding physical interface drivers (not shown). The PPP Global Interface 12 is controlled by a PPP Global Interface driver (not shown) which, in an exemplary embodiment, is implemented in software. The router control module includes control logic that is used to control operations of the router 10. The device 22 also includes a PPP module 14 and a demultiplexer 20. The PPP module 14 includes control logic that is used to establish a PPP session and control interactions with the PPP Global Interface 12. The demultiplexer 20 controls routing of packets between clients and the corresponding physical interfaces 16. It should be further understood that, in alternative exemplary embodiments (not shown), the device 22 as shown in FIG. 1 may include more than one (1) router; the present invention as described herein is similarly applicable to the device 22 having multiple virtual routers.

In non-routed cases, i.e., cases in which only data traffic, and no routing control traffic, is transmitted, only a client 18 or host is expected to dial in to the router 10 using PPP protocol. Since this results in a leaf node for a routed graph, no more than one route is expected to be reachable via this particular interface. No routing updates using routing protocols are expected to be received on such interface.

The PPP Global Interface 12 operates in the following exemplary manner. The client is interfaced to a corresponding physical interface 16. When the client 18 initially contacts the router 10 to establish a non-routed PPP session, the communication is directly relayed to the PPP module 14 from the demultiplexer 20 for processing. Upon receiving indications that the non-routed PPP session is to be established, the PPP module 14 performs a number of tasks to ensure that the PPP session can be established. For example, the PPP module 14 performs authentication to ensure that the client is allowed to communicate with the router 10. The PPP module 14 may also look up other relevant information that is related to the PPP session that is to be established. For example, the PPP module 14 may look up terms and conditions relating to quality of service that is to be provided for the particular client during the PPP session. The PPP module 14 functions in conjunction with the IP stack 18 to establish the PPP session.

Once the PPP module 14 has completed its tasks and established the PPP session, the PPP module 14 requests the router control module in the virtual router 10 to dynamically create an interface data structure or module that corresponds to the established PPP session. When making this request, the PPP module 14 passes the relevant information relating to the client to the router control module. Session data relating to the PPP session is included in the interface data structure. The session data includes, for example, appropriate Layer-2 and Layer-3 information and other relevant information relating to the client. Upon creating the interface data structure, the router control module updates the PPP Global Interface 12. As part of the update, the interface data structure is linked to the PPP Global Interface 12. The PPP session and communications with the client are then achieved using information included in the dynamically created and now linked interface data structure. It should also be noted that the router control module is able to create an interface data structure that can accommodate any one of the physical interfaces 16 on the router 10. This, in turn, allows the PPP Global Interface 12 to handle communications with any one of the physical interfaces 16. The different types of physical interfaces 16 include, for example, an asynchronous transfer mode (ATM) physical interface, a frame relay (FR) physical interface, an Ethernet physical interface, and the like. As described above, the corresponding interface data structure for each PPP session is linked to the PPP Global Interface 12. Consequently, when multiple PPP sessions are established, the PPP Global Interface 12 may be linked to multiple interface data structures corresponding to the multiple PPP sessions.

Each subscriber or client PPP session is tied to the PPP Global Interface 12 via the corresponding interface data structure. Non-routed traffic generated during the PPP session is processed exclusively by the PPP Global Interface driver. For example, any non-routed PPP traffic sent to the router 10 from the client is received and processed by the PPP Global Interface driver. Any non-routed PPP traffic sent out to the client from the router 10 is also sent out through the PPP Global Interface 12. In an exemplary implementation, the IP characteristic of the PPP Global Interface 12 is an IP address with a 32-bit mask or a mask with the value "255.255.255.255". Traffic other than non-routed PPP traffic and traffic not destined for PPP clients are processed directly between the IP stack 18 and the corresponding physical interface driver without the intervention of the PPP Global Interface 12.

In an exemplary implementation, each client's input/output parameters are stored in the interface data structure created for that client. FIG. 2A illustrates an exemplary embodiment of an interface data structure constructed in accordance with the present invention. In this exemplary embodiment, the interface data structure is designed to include Layer-2 and Layer-3 information which is kept separately. Layer-2 information includes information relating to physical interfaces, such as, link number or virtual path identifier (VPI) and virtual channel identifier (VCI). Layer-3 information includes information relating to IP addresses. This exemplary interface data structure is smaller than a conventional interface data structure. FIG. 2B illustrates a typical interface data structure. In an exemplary implementation, the exemplary interface data structures for the corresponding PPP links are stored in the form of a hash-list under the PPP Global Interface 12.

When the non-routed PPP session is terminated, the PPP Global Interface 12 removes the interface data structure previously created for that PPP session. This dynamic creation and removal of interface data structures allows for more efficient use of computing resources.

The present invention provides a number of benefits and advantages. For example, computing resources on the router can be saved because IP address space on the router is reduced. A considerable amount of memory space is also saved because not all the virtual links are used. Furthermore, since the number of interfaces on the router is reduced, the interface look-up speed on the router is accordingly improved.

By using the PPP Global Interface 12 as described above, the routing table associated with the virtual router 10 is optimized. In a traditional router that has virtual links for each PPP session, it would require a unique route to be added for each PPP session. This would make the routing table size grow linearly with the number of PPP sessions. With the approach of the present invention, only subnet routes are added to the routing table. These subnet routes point to the PPP Global Interface 12. When a packet is destined for a non-routed PPP client, the IP stack 18 hands over the packet for transmission to the PPP Global Interface driver (since the IP address of the PPP session falls within a subnet and that subnet route points to the PPP Global Interface 12). The PPP Global Interface driver then looks up the interface data structure corresponding to the PPP session based on the destination IP address within the packet. Once the appropriate interface data structure is obtained, the information in the interface data structure is used to forward the packet over the corresponding physical interface. By adding only subnet routes in the routing table, the size of the routing table is greatly reduced.

Furthermore, the PPP Global Interface 12 can also be used to reduce the number of IP addresses that are required for routed PPP sessions. In one exemplary implementation, the PPP Global Interface 12 has an associated IP address, referred to herein as the PPP Global IP address. The PPP Global IP address can be used as the local IP address for unnumbered interfaces. An unnumbered interface is defined as an interface that does not have a local IP address. For a traditional interface, the interface needs a local IP address so that it can be properly addressed. However, with point-to-point links, a unique local IP address is not necessary. Moreover, by having a unique local IP address, an IP address is needed for each point-to-point link. To optimize this unnecessary consumption of IP addresses, the concept of unnumbered links is used. This concept is an industry standard. When using unnumbered links, the router uses the IP address of another interface as the local IP address of a point-to-point link. This other interface has to be an interface that is present for the entire life of the router. In an exemplary implementation, the PPP Global IP address can be used to implement the concept of unnumbered links. The PPP Global IP address can be used as the local IP address for all routed PPP sessions (sub-interfaces) since the PPP Global Interface 12 is added to the router 10 when the router 10 is initialized and remains available for the entire life of the router 10.

In an exemplary implementation, the PPP Global Interface, the PPP module and other components of the present invention are implemented using software in the form of control logic, in either an integrated or a modular manner. Alternatively, hardware or a combination of software and hardware can also be used to implement the present invention. In addition, the respective functionality of the various components of the present invention can be combined or distributed as deemed appropriate, depending on the specific design and/or system requirements. Based on the disclosure and teachings provided herein, a person of ordinary skill in the art will know of other ways and/or methods to implement the present invention.

It should also be noted that while the foregoing description is provided in connection with a router, a person of ordinary skill in the art will appreciate that the present invention can similarly be applied to other types of devices that are capable of handling PPP sessions.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference for all purposes in their entirety.

What is claimed is:

1. An optimized interface for handling non-routed point-to-point (PPP) sessions, comprising:
   control logic configured to link to an interface module, the interface module having information relating to a client and a PPP session, wherein the interface module is created after the PPP session is established;
   control logic configured to use the information in the interface module to facilitate communications with the client for duration of the PPP session, wherein the interface module comprises information describing a physical interface associated with the client and the PPP session; and
   control logic configured to remove the link to the interface module when the PPP session is terminated; and
   a routing table, wherein the routing table is optimized by including only subnet routes associated with corresponding non-routed PPP sessions, wherein the subnet routes point to the optimized interface;
   wherein the optimized interface is configured to receive data packets for a client routed to the optimized interface and to forward the data packets to the client over a physical interface corresponding to a linked interface module associated with the client;
   wherein the client is interfaced to one of a plurality of physical interfaces; and
   wherein the optimized interface is able to handle communications with the client for the duration of the PPP session regardless of which one of the plurality of physical interfaces the client is interfaced to.

2. The optimized interface of claim 1 wherein the information included in the interface module includes Layer-2 and Layer-3 information relating to the client.

3. The optimized interface of claim 1 wherein the plurality of physical interfaces include an asynchronous transfer mode interface, a frame relay interface and an Ethernet interface.

4. The optimized interface of claim 1 wherein the optimized interface is implemented using software.

5. A router incorporating the optimized interface of claim 1.

6. The optimized interface of claim 1 wherein the optimized interface is associated with a global Internet Protocol (IP) address; and
   wherein the global IP address is used as a local IP address for a PPP client having a routed PPP session.

7. A system for handling non-routed PPP sessions, comprising:
   a plurality of physical interfaces, each physical interface configured to interface to a corresponding client;
   an interface configured to handle corresponding PPP sessions with one or more clients interfaced to the corresponding physical interfaces, regardless of which one of the plurality of physical interfaces a client is interfaced to;
   a PPP module configured to create an interface module for each corresponding PPP session; and
   a routing table, wherein the routing table is optimized by including only a subnet route associated with a corresponding PPP session, wherein the subnet routes point to the interface, and wherein the interface is configured to receive data packets for a client routed to the interface and to forward the data packets to the client via a physical interface of the plurality of physical interfaces;
   wherein the interface module is used to facilitate communications between the interface and the physical interface used for the corresponding PPP session; and
   wherein the interface is further configured to remove the interface module when the corresponding PPP session with that client is terminated.

8. The system of claim 7 wherein the interface module includes Layer-2 and Layer-3 information and other information relating to the corresponding PPP session.

9. The system of claim 7 wherein the plurality of physical interfaces include an asynchronous transfer mode interface, a frame relay interface and an Ethernet interface.

10. The system of claim 7 wherein the interface is implemented using software.

11. A router incorporating the system as recited in claim 7.

12. The system of claim 7 wherein the interface is associated with a global Internet Protocol (IP) address; and
   wherein the global IP address is used as a local IP address for PPP clients having routed PPP sessions.

13. A method for handling non-routed point-to-point (PPP) sessions, comprising:
   establishing a PPP session for a client;
   creating an interface module for the established PPP session, the interface module having information relating to the PPP session and the client;
   linking the interface module to an interface;
   optimizing a routing table associated with the interface by including only subnet routes associated with corresponding PPP sessions; and
   using the interface module to facilitate communications with the client for the duration of the PPP session, and
   removing the link between the interface and the interface module when the PPP session is terminated;
   wherein the client is interfaced to one of a plurality of physical interfaces;
   wherein the interface is configured to receive data packets for the client routed to the interface and to forward the data packets to the client using the interface module; and wherein the interface module is able to facilitate communications with the client for the duration of the PPP session regardless of which one of the plurality of physical interfaces the client is interfaced to.

14. The method of claim 13 wherein the information included in the interface module includes Layer-2 and Layer-3 information relating to the client.

15. The method of claim 13 wherein the plurality of physical interfaces include an asynchronous transfer mode interface, a frame relay interface and an Ethernet interface.

16. The method of claim 13 wherein the method is implemented using software.

17. A router utilizing the method as recited in claim 13.

18. The method of claim 13 further comprising:
associating a global Internet Protocol (IP) address with the interface; and
using the global IP address as a local IP address for PPP clients having routed PPP sessions.

* * * * *